United States Patent [19]

Dragotin

[11] Patent Number: 4,718,084

[45] Date of Patent: Jan. 5, 1988

[54] OVERLOAD PROTECTION CIRCUIT FOR A TELEPHONE SUBSCRIBER LINE FEED CIRCUIT

[75] Inventor: Alexander Dragotin, Puchheim, Fed. Rep. of Germany

[73] Assignee: Siemens Aktiengesellschaft, Berlin and Munich, Fed. Rep. of Germany

[21] Appl. No.: 806,163

[22] Filed: Dec. 5, 1985

[30] Foreign Application Priority Data

Dec. 19, 1984 [DE] Fed. Rep. of Germany ....... 3446391
Dec. 19, 1984 [DE] Fed. Rep. of Germany ....... 3446362

[51] Int. Cl.$^4$ ........................................... H04M 19/00
[52] U.S. Cl. ...................................... 379/412; 379/413
[58] Field of Search ............... 379/398, 399, 324, 413, 379/412, 400, 377; 361/90, 91, 119

[56] References Cited

U.S. PATENT DOCUMENTS

| | | | |
|---|---|---|---|
| 4,211,895 | 7/1980 | Davis et al. | 379/398 X |
| 4,398,066 | 8/1983 | Sinberg | 379/412 |
| 4,465,903 | 8/1984 | Barber | 379/412 X |
| 4,525,602 | 6/1985 | Robra et al. | 379/412 |

FOREIGN PATENT DOCUMENTS

| | | | |
|---|---|---|---|
| 3312935 | 10/1984 | Fed. Rep. of Germany. | |
| 0194455 | 11/1983 | Japan | 379/412 |

*Primary Examiner*—Jin F. Ng
*Assistant Examiner*—R. Vaas
*Attorney, Agent, or Firm*—Jeffrey P. Morris

[57] ABSTRACT

One arm of a subscriber line battery feed circuit (Ra, Rb, B) contains a FET transistor (TrL) as a current limiting element which, when a limit value of feed current is reached, is operated in such manner that it limits the feed current. If the limiting operation exceeds a first time interval, the feed circuit is interrupted by the blockage of the transistor. The transistor cannot resume the conductive state until the elapse of a second, longer time interval which is sufficient for cooling the transistor. The threshold value is not rigid but changes in accordance with the amplitude and direction of interference longitudinal currents which are superimposed upon the feed current.

5 Claims, 3 Drawing Figures

OVERLOAD PROTECTION CIRCUIT FOR A TELEPHONE SUBSCRIBER LINE FEED CIRCUIT

BACKGROUND OF THE INVENTION

1. Field of the Invention

The invention relates to telephone overload protection circuits and particularly to a circuit arrangement for protecting a telephone subscriber line feed circuit in a preferably digital telephone exchange system from overloads occuring due to a short-circuit or an impermissibly low-ohmic shunt between the wires of the subscriber line.

2. Description of the Prior Art

In view of the necessity to feed power to a telephone line, the feed resistors in subscriber feed lines are relatively low-ohmic. The currents which flow through these feed resistors in the case of a short-circuit or in the case of an impermissibly low-ohmic shunt are sufficiently substantial to cause the power consumption which occurs across the feed resistors to lead to their damage.

In a known circuit arrangement, one of the functions of which is to protect the feed circuit of the subscriber line of a digital time division multiplex telephone exchange system (German Application 33 12 925), at short intervals of time of equal duration, the current of the subscriber connection line connected to the subscriber telephone circuit in question is scanned and is subjected to analog to digital conversion. The period duration of the scanning here represents a whole-numbered fraction of a period of a longitudinal current produced, for example, by the high voltage currents of a power distribution network. The digitalised scan values are added over this period and the sum value is then compared with a given permissible maximum value. When this maximum value is exceeded, the feed circuit is interrupted.

In this arrangement it is provided that such an interruption is carried out when, even after one single scanning, the value of the maximum permissible current is exceeded by a predetermined extent. No attempt is made to eliminate the influence of longitudinal currents which in this case play a subordinate role.

The analysis of the described measurement and the corresponding initiation of a circuitry measure is effected in the known arrangement by a microprocessor which is assigned, as a sub-control unit, to a group of such subscriber telephone circuits. It has been proved that this type of analysis takes up a substantial proportion of the available processing time of the microprocessor and that the microprocessor is considerably hindered in respect to its proper function as a control unit inasmuch as short-circuits and impermissibly high shunts must be immediately detected and appropriate circuitry measures initiated.

The aim of the invention consists in providing a circuit arrangement for protecting the subscriber feed circuit which is more favorable in this respect and which is also adapted to the special features of the subscriber feed circuit in that it is capable of distinguishing between increased currents due to the charging of capacitors—in particular, high capacity electrolytic capacitors—of the feed circuit and between increased currents caused by short-circuits and undesired shunts.

SUMMARY OF THE INVENTION

In accordance with the invention, this aim is fulfilled by a curcuit arrangement which is characterized by a current limiting element which is located in the feed circuit of the subscriber line circuit. When the load of the subscriber line circuit assumes an impermissibly high value, the feed circuit is controlled in such manner that it limits the line feed current to a permisible value and, if this control, which leads to the current limitation, continues beyond a first given time interval or re-occurs during a second comparatively longer time interval which follows the first time interval, then, the feed current is brought into the blocked state in which it interrupts the operation of the feed circuit and from which blocked condition it is released only following the elapse of a third time interval which is of equal length to the second time interval and which commences at the start of the blocked state.

In practice this first time interval corresponds to the charging time of the capacitors of the subscriber feed circuit so that whenever an increase in current is due to the charging of these capacitors or when such short circuits or low-ohmic shunts are of only short duration, although the feed current may be temporarily limited, it is not completely disconnected. Disconnection is carried out only when, following the elapse of the first time interval, the increased load of the subscriber feed circuit or the operation of the current limiting element which leads to a subsequent current limitation still prevail or have re-occurred during the second time interval. The second and third time intervals are contrived in accordance with the cooling time required by the current limiting element which has reached an increased operating temperature during the limiting operation, to cool to a normal operating temperature. The purpose of the second time interval is to ensure that an interruption of the feed circuit takes place even when the overloads are so short in length that they do not exceed the first time interval and therefore would not result in an interruption in the feed circuit, but nevertheless occur in time intervals which are inadequate for the cooling of the current limiting element.

Superimposed upon the useful current on the subscriber telephone line supplied by the subscriber line feed circuit are interference alternating currents in the form of longitudinal currents on the subscriber line wires caused by interference picked up, for example, from induced telephone interference or the power distribution network. Interference currents of this kind can cause the given maximum value of the feed current to be frequently exceeded for short periods of time without the need for current limitation in the interests of protecting the subscriber feed circuit. Since current limitation by means of the current limiting element introduced, in accordance with the invention, into an arm of the subscriber feed circuits leads to a disturbance of the symmetry condition on the wires of the telephone subscriber line, current limitation which is superfluous in respect of the longitudinal currents is undesirable. It would in fact be possible to set the threshold value provided for the feed current at which the limitation commences to be sufficiently high that longitudinal currents no longer initiate the limiting operation. However, when currents on the telephone subscriber line which are produced by a low-ohmic shunt and are thus of longer duration approach such a limit value, the power loss which thus occurs is likely to be too high.

In accordance with a further development of the invention, in the circuit arrangement in accordance with the invention, the drive threshold which, when exceeded, causes the current limiting element to commence its limiting operation, is therefore increased or reduced in accordance with the direction and amplitude of longitudinal alternating currents which occur by way of interference on the wires of the telephone subscriber line.

Further developments of the invention relate to expedient circuitry designs.

In the following detailed description, the invention will be explained in detail making reference to exemplary embodiments and three drawings.

DETAILED DESCRIPTION

Figure 1:
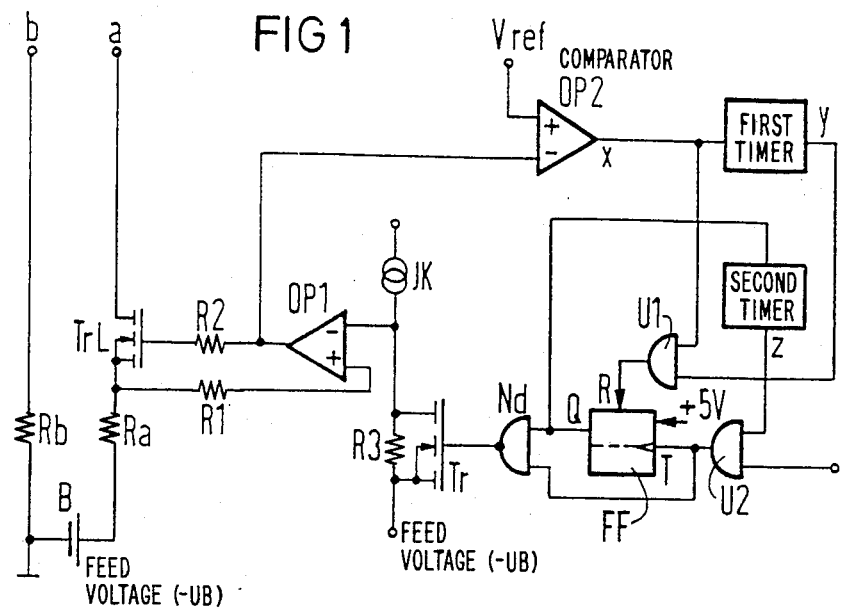
FIG. 1 represents a first exemplary embodiment of the circuit arrangement in accordance with the invention.

FIG. 1 represents a feed battery B and feed resistors Ra and Rb of a subscriber line feed circuit which is to represent a part of a subscriber line circuit. The terminals a and b of this feed circuit are to be assumed to be connected to the wires of a subscriber's telephone line.

A power transistor TrL, which is to represent a FET transistor, is inserted by its main current path into that arm of the feed circuit which contains the feed resistor Ra. The control voltage for this transistor is supplied by an operational amplifier OP1 whose inverting input is connected via a resistor R1 to the connection point of the feed resistor Ra and the source electrode of the power transistor TrL. The non-inverting input of the operational amplifier OP1 is connected to the connection point of the series arrangement of a constant current source JK and a resistor R3. The other terminal of the resistor R3 is connected to feed voltage potential —UB which also prevails at the other terminal of the feed resistor Ra. The resistor R3 is connected in parallel with the main current path of a further FET transistor Tr. The output of the operational amplifier OP1 is connected to the first input of a comparator OP2 whose other input is supplied with a reference voltage VRef. The output of the comparator OP2 is connected on the one hand to the input of a first timer ZG1 which operates in such manner that a change in potential at its input from the binary value 0 to the binary value 1 does not lead to a change in potential to the binary value 1 at its output until a specified delay time, for example one second, has elapsed; compare x and y in FIG. 2. The timer ZG1 also operates in such manner that the emission of the potential, corresponding to the binary value 1, at the output is maintained for a second time interval which is longer than the first time interval, irrespectively of which binary value occurs at the input. The second time interval amounts, for example, to 20s, after which the potential at the output of the timer ZG1 re-assumes the binary value 0; see y in FIG. 2.

The output of the first time ZG1 is connected to the first input of an AND-gate U1 whose other input is connected to the output of the comparator OP2. The output of the AND-gate U1 is connected to the reset input R of a bistable circuit FF which represents a D-flip-flop.

The output Q of the bistable circuit FF is connected to the first input of a NAND-gate Nd whose output is connected to the control input of the transistor Tr.

The output Q of the bistable circuit FF is also connected to the input of a second timer ZG2 which is designed to be such that it normally supplies from its output the potential corresponding to the binary value 1 and when a binary character change from the binary value 1 to the binary value 0 occurs at its input, at its output it emits a potential corresponding to the binary value 0 for the duration of a third delay time which is equal in length to the second delay time and thus likewise amounts, for example, to 20s, whereupon it again supplies the potential corresponding to the binary value 1.

The output of the timer ZG2 is connected to the first input of a further AND-gate U2 whose output is connected on the one hand to the clock input T of the bistable circuit FF and on the other hand to the second input of the aforementioned NAND-gate Nd. The other input of the AND-gate U2 can be supplied with a binary signal which is itself supplied, for example, by a microprocessor which primarily serves as a sub-control unit of the circuit group to which the illustrated subscriber feed circuit and associated subscriber line circuit belong. This signal has the binary value 0 when the feed circuit is to be interrupted for any other reason, for example for measurement purposes, but normally it has the binary value 1. In the following the mode of functioning of the described circuit arrangement will be discussed in further detail.

For such time as the current in the feed circuit and thus the current flowing through the feed resistor Ra remains below a given maximum value, the voltage drop across the feed resistor Ra differs from the voltage drop produced across the resistor R3 by the current supplied by the reference current source JK in such manner that at the output of the operational amplifier OP1 a potential occurs which fully drives the transistor TrL so that the latter represents a constant low-ohmic resistance for the feed circuit. The aforementioned use of a power FET by way of transistor TrL ensures that the transistor resistance is independent of current over a certain current range.

When the voltage drop across the feed resistor Ra approaches the voltage drop across the resistor R3, the transistor TrL is driven by the operational amplifier in such manner that its resistance increases and thus limits the current in the feed circuit.

On the basis of an appropriate dimensioning of the reference voltage which acts upon the comparator OP2, and of the voltage supply thereof, the value of the output voltage of the operational amplifier OP1 which initiates the limiting or control operation causes this comparator OP2 to react in the form of a transition. However, as described, during the first delay time, and thus for a further second, the timer ZG1 supplies from its output a potential corresponding to the binary number 0, with the result that the logic-link condition of the AND-gate U1 is not fulfilled and initially no change occurs in the conductivity state of the bistable circuit FF. At the end of this first delay time, the timer ZG1 supplies a potential corresponding to the binary value 1 for the duration of the aforementioned second time interval of 20s so that whenever the limitation state, which leads to the emission of the binary value 1 from the output of the comparator OP2, has exceeded the first time interval or re-occurs at any point within the second time interval, the logic-link condition of the AND-gate U1 is fulfilled. Consequently, this AND-gate resets the bistable circuit FF with the output signal which is then supplied and which has the binary value 1.

The signal having the binary value 0 which is emitted from the output Q of the bistable circuit now that the transition state has been reached acts via the NAND-gate Nd on the control electrode of the transistor Tr with the result that this transistor is driven and therefore its main current path bridges the resistor R3 in low-ohmic fashion. As a result of the change in voltage which now takes place at the noninverting input of the operational amplifier OP1, the operational amplifier now supplies an output voltage which is such that the transistor TrL is brought into the blocked state and thus interrupts the feed circuit.

Figure 2:
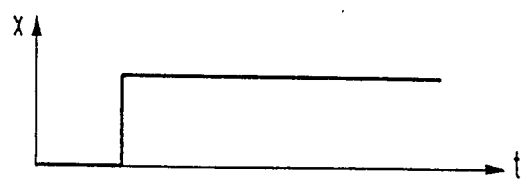
FIG. 2 represent the curve of output signals at specific points of the circuit arrangement shown in FIG. 1.
Figure 2:
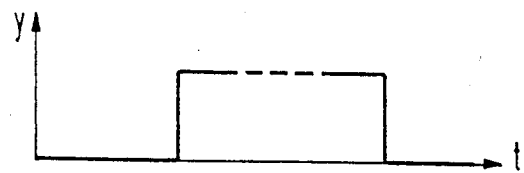
Figure 2:
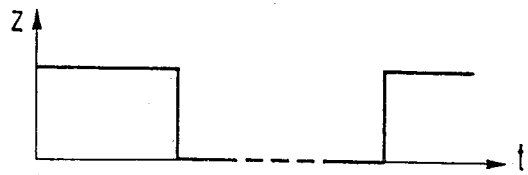

The signal having the binary value 0 which occurs at the output of the bistable circuit FF and which triggers this process results in a change from the binary value 1 to the binary value 0 at the output of the timer ZG2, and the binary value 0 continues to be emitted for the duration of the third time interval, thus likewise for 20s; see z in FIG. 2. During this time interval the AND-gate U2 is thus blocked so that a reconnected command which can reach the second input of the AND-gate from the aforementioned microprocessor is not forwarded. The third time interval is sufficient to permit the transistor TrL to cool from the temperature it has reached during the limiting operation to a normal temperature.

At the end of the third time interval the timer ZG2 again supplies the binary value 1 and therefore the AND-gate U2 is released so that any secondary change which might then occur in the output voltage supplied by the microprocessor to the binary value 1 on the one hand can act via the NAND-gate Nd on the control electrode of the transistor Tr and can cause this transistor to re-assume the blocked state, and on the other hand serves to set the bistable circuit FF so that, depending upon the load conditions of the feed circuit which then prevail, either normal operation or the above-described limiting operation recommences.

Figure 3:
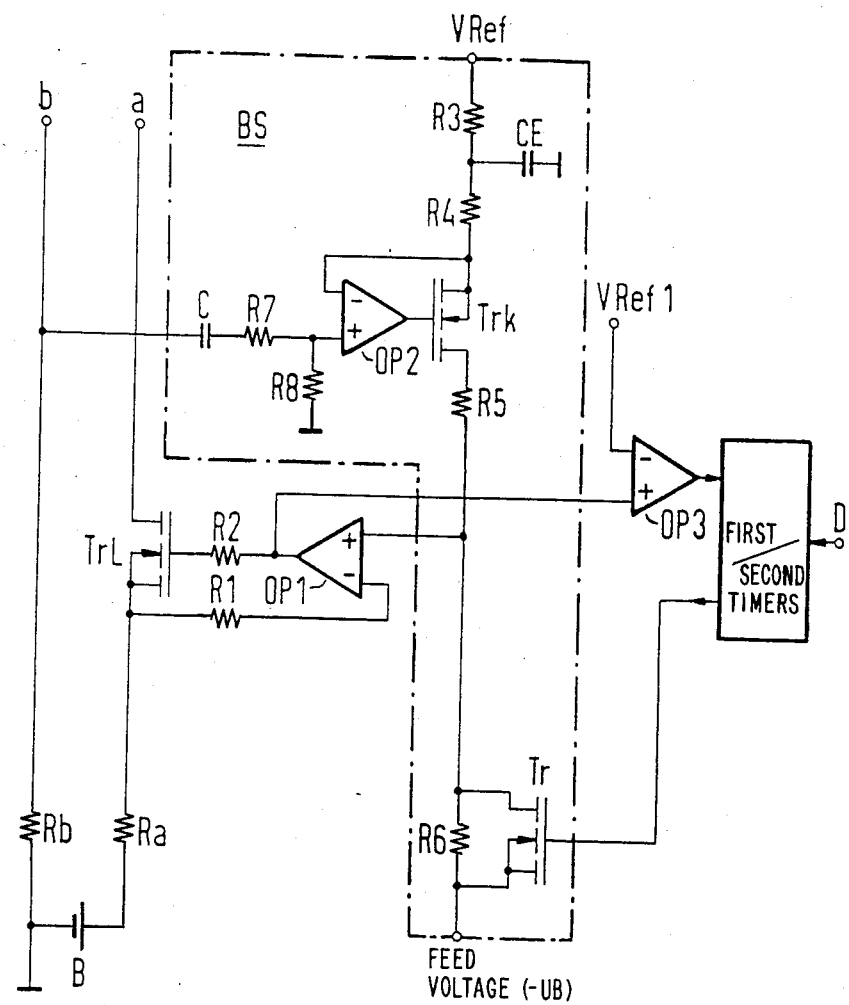
FIG. 3 represents a further exemplary embodiment designed in accordance with the aforementioned further development of the invention.

The description of the circuit arrangement illustrated in FIG. 3 will mainly focus on the circuit component BS which serves to generate the reference voltage since the feed circuit shown in FIG. 3, together with the current limiting element, corresponds to the conditions shown in FIG. 1. The timing circuits shown in FIG. 1 have been fundamentally replaced by the timer $ZG\frac{1}{2}$, the function of which is irrelevant to the explanation of the reference voltage circuit.

A fundamental component of the reference voltage circuit BS consists of a FET-transistor TrK whose source electrode is connected to a reference voltage VRef via the series arrangement of the resistors R3 and R4. The drain electrode is connected via resistors R5 and R6 to a circuit point which is connected to feed voltage potential. The connection point of the resistors R5 and R6 forms the aforementioned output of the reference voltage circuit. The source electrode of the transistor Trk is connected to the inverting input of a second operational amplifier OP2 whose output is connected to the gate electrode of the transistor Trk and whose non-inverting input is connected to the connection of resistors R7 and R8 of a voltage divider which consists of these resistors and of a capacitor C. The aforementioned voltage divider is connected in parallel to the feed resistors Rb. On account of the capacitor C, the operational amplifier OP2 is influenced only by the a.c. components of the feed current in that branch of the subscriber feed circuit which contains the feed resistor Rb.

The connection point between the aforementioned resistors R3 and R4 is connected via an electrolytic capacitor CE to the reference point to which one pole of the feed battery B is connected. Together with the resistor R6, the resistors R3 and R4 fundamentally determine the value of the maximum permitted feed current by determining the potential at the inverting input of the operational amplifier OP1. The ratio between the resistors R3 and R4 is co-responsible for the fact that this maximum permitted feed current is dependent, to the desired level, upon the longitudinal alternating currents on the telephone subscriber line. The capacitor CE also has the function of avoiding interference voltages which could manifest if the reference earth of the battery differs in respect of potential from the reference earth for the useful signal currents flowing on the telephone subscriber lines.

The output of the operational amplifier OP1 is connected to the first input of a comparator OP3 whose other input is connected to a further reference voltage VRef1. The output signal supplied by the comparator OP3 is fed to the timer circuit $ZG\frac{1}{2}$. The output signal supplied by this timer circuit serves as control value for a FET transistor Tr whose main current path is connected in parallel to the aforementioned resistor R6 of the reference voltage circuit BS.

In the following the mode of functioning of the circuit arrangement in accordance with the invention will be described in detail. For such time as the current in the feed circuit, and thus the current flowing through the feed resistor Ra, remains below a given maximum value, the voltage drop across the feed resistor Ra differs from the voltage drop which the constant current—supplied by the constant current source formed by the transistor Trk produces across the resistor R6, in such manner that the output signal which is emitted from the operational amplifier OP1 and which represents the control signal for the transistor TrL permits this transistor to remain in a conductivity state in which it represents a constant, low-ohmic resistance for the feed circuit.

When the voltage drop across the resistor Ra approaches the voltage drop across the resistor R6, the transistor TrL is driven by the operational amplifier OP1 in such manner that its resistance increases and thus limits the current in the feed circuit.

The current which is supplied by the transistor Trk of the reference voltage circuit and which produces the reference voltage for the operational amplifier OP1 is determined by the output signal of the operational amplifier OP2, which signal is itself dependent upon the a.c. voltage component which is output-coupled, with the assistance of the voltage divider consisting of the capacitor C and the resistors R7 and R8, from that arm of the feed circuit which contains the feed resistor Rb. In this way it is provided, in accordance with the invention, that the input voltage for the non-inverting input of the operational amplifier OP2 changes in accordance with the amplitude and direction of longitudinal alternating currents which are superimposed upon the feed current and which each have the same direction and amplitude on both line wires. This ensures that such longitudinal alternating currents cannot cause the limit value for the feed current to be reached, to which the transistor TrL is driven and thus a feed current limitation commences.

As a result of appropriate dimensioning of the reference voltage VRef1 which acts upon the comparator OP3, the change in the output voltage of the operational amplifier OP1 which initiates the limiting or control operation causes this operational amplifier to react in the manner of a voltage jump. Because of the delay of, for example, one second produced by the time circuit ZG½, initially this voltage jump can remain without influence upon the circuit arrangement. However, at the end of the delay time interval the voltage jump leads to the emission of an output signal if at this time the operational amplifier OP1 still emits the aforementioned modified output signal voltage which indicates that an impermissibly high load on the feed circuit still exists or has re-occurred. This output signal causes the transistor Tr to assume the conductive state with the result that the non-inverting input of the operational amplifier OP1 reaches the potential-UB whereupon it supplies an output voltage which is such that the transistor TrL is brought into the blocked state and thus interrupts the feed circuit.

The nature of the time circuit ZG½ is such that a reconnect command which reaches the input D of said timer circuit and which preferably emanates from a microprocessor which primarily serves as a sub-control unit of the exchange to which the illustrated circuit arrangement is assigned, cannot lead to a re-blockage of the transistor Tr until the end of a further delay time. This delay time is substantially longer than the first-mentioned delay time and amounts, for example, to 20s and is sufficient to permit the transistor TrL, which has reached an increased temperature during the limiting operation, to cool to a normal operating temperature. Depending upon the current conditions which then prevail in the feed circuit, a reconnect command of this kind causes either normal operation or the above-described limiting operation to recommence.

Thus, there has been shown and described a novel overload protection circuit for a telephone subscriber line circuit only limited by the claims which follow.

What is claimed is:

1. A circuit arrangement for protecting a subscriber line feed circuit from overload as a result of a short-circuit or a low-ohmic shunt between the wires of a subscriber telephone line, characterized by a current limiting element which is located in a battery feed circuit of the subscriber line feed circuit and which, when the load of the subscriber line feed circuit is higher than a predetermined value, limits the feed current to a desired value and, when the duration of said current limitation exceeds a given first time interval or re-occurs during a second longer time interval with respect to and following the first time interval, interrupts the current flow through the feed circuit, and means for releasing said interruption only on the elapse of a third time interval substantially equal in duration to the second time interval and which commences at the start of the interruption of said current flow through said feed circuit.

2. The circuit arrangement as claimed in claim 1, characterized in that the first time interval corresponds in time duration to the charging time of the capacitors of the subscriber line feed circuit and the second and third time intervals correspond to the time duration required to allow the current limiting element to cool from the temperature which it has reached during the limiting operation to the operating temperature prior to the limiting operation.

3. The circuit arrangement as claimed in claim 1 characterized in that the current limiting element is a field effect power transistor having a main current path located in the battery feed circuit of the subscriber line feed circuit.

4. The circuit arrangement as claimed in claim 3, characterized in that it comprises an operational amplifier which supplies the drive signal for the transistor, the operational amplifier being located in the battery feed circuit and whose inputs are acted upon at one input thereof by the voltage connected to the feed resistor of one arm of the subscriber feed circuit in which the transistor is located, and also at the other input of which by the voltage produced across a special resistor by a reference current source, and wherein the special resistor is bridged in low-ohmic manner by the main current path of a further field effect transistor which is brought from a blocked state into a conductive state when the feed current is interrupted by the transistor located in the battery feed circuit.

5. The circuit arrangement as claimed in claim 4, characterized in that it comprises a comparator which at one input of which the output voltage is acted upon by the output voltage of the first operational amplifier and at the other input of which a reference voltage is applied, and which is also coupled to a first timing element whose input is connected to the output of the comparator and which derives the first and second time intervals and having an output voltage emitted during the second time interval which is coupled to the output voltage supplied by the comparator to form a reset signal for a bistable circuit, a having an output voltage, which is emitted in the reset state, and which serves said further transistor as a drive signal which initiates the conductive state; and a second timing element which is fed by the drive signal supplied by the bistable circuit and which for the duration of the third time interval, supplies an output voltage which suppresses the transmission of an independently-produced drive signal for the further transistor, which signal also is a set signal for the bistable circuit.

* * * * *